S. R. HUNTER.
Harvester Rake.
No. 16,145
Patented Dec. 2, 1856.
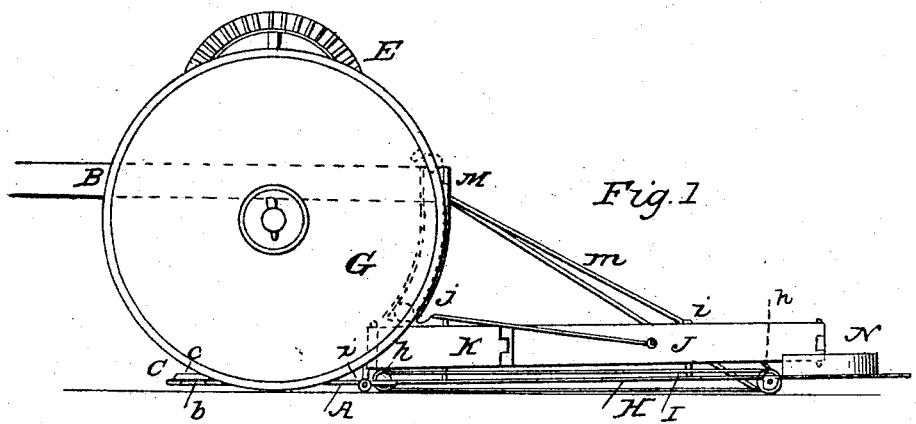
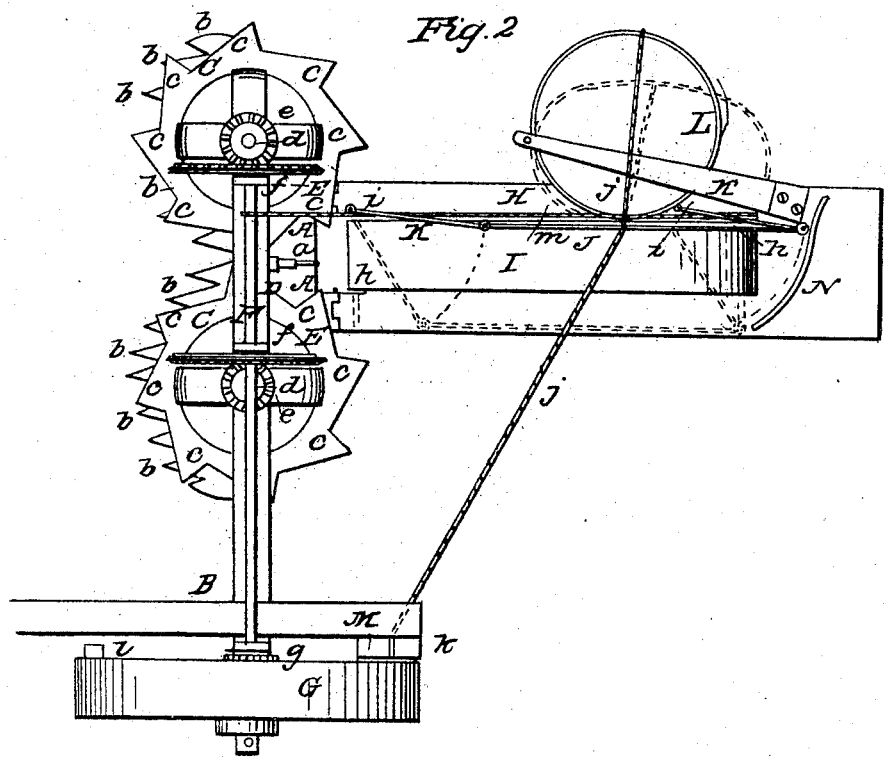

UNITED STATES PATENT OFFICE.

S. R. HUNTER, OF CORTLAND, NEW YORK.

IMPROVED RAKING APPARATUS FOR HARVESTERS.

Specification forming part of Letters Patent No. 16,145, dated December 2, 1856.

*To all whom it may concern:*

Be it known that I, STEPHEN R. HUNTER of Cortland, in the county of Cortland and State of New York, have invented a new and Improved Raking or Discharging Device to be Applied to Harvesters; and I do hereby declare that the following is a full, clear, and exact description of the same, reference being had to the annexed drawings, making a part of this specification, in which—

Figure 1 is a side view of my improvement. Fig. 2 is a plan or top view of the same.

Similar letters of reference indicate corresponding parts in the two figures.

My invention consists in the employment or use of an endless apron and movable bar or rake, and the mechanism for working the same, in combination with rotary cutters, when the above parts are arranged for operating as will be hereinafter fully shown and described.

To enable those skilled in the art to fully understand and construct my invention, I will proceed to describe it.

A A represent two plates, which are connected by a hinge or joint, *a*. The front sides of these plates are of semicircular form, and have fingers *b* on them of the usual pointed or taper form, as shown clearly in Fig. 2. One of these plates is attached to the main frame B of the machine.

On each plate A a circular cutter, C, is placed. These cutters have the usual triangular or saw-shaped teeth, *c*, formed on them, and the cutters are attached to vertical shafts *d*, the upper ends of which are fitted in a bar, D, which forms a part of the main frame B.

The upper end of each shaft *d*, above the bar D, has a pinion *e* upon it, and these pinions gear into wheels E E, which are placed upon a shaft, F, which works in the upper ends of uprights *f*, attached to the bar D, the shaft F being parallel with the bar D. The inner end or the shaft F has a pinion, *g*, upon it, said pinion gearing into teeth on the inner periphery of the driving-wheel G of the machine. The wheel G is fitted on an arm at one end of the bar D.

H represents a platform which is hinged, or it may be permanently attached, to the plates A A. The platform H has an oblong slot made in it to receive an endless apron, I, which is placed directly in line with the space between the two cutters C C, as shown in Fig. 2. The endless apron I works over rollers *h h*, attached to the platform H.

J represents a bar the ends of which are hinged to arms K, which work on vertical rods *i*, attached to the platform H.

L is a spring attached to the platform H, and *j* is a rod or chain, which is attached to the spring L and bar J. The rod or chain passes through the bar J, and a ball, *k*, is secured to its end, said ball being fitted in a curved box, M, attached to the back part of the main frame B and adjoining the periphery of the driving-wheel G.

To the inner side of the driving-wheel G, near its edge or periphery, a projecting plate, *l*, is attached, which, as the driving-wheel rotates, passes through the box M.

N is a stop place on the back part of the platform H.

The operation will be readily seen. As the machine is drawn along the grain is cut by the rotating cutters C C and passes butts foremost between the two cutters and upon the endless apron I, by which it is conveyed by the side of the bar J. The bar J, every time the projecting plate *l* passes through the box M, is moved outward to the edge of said plate and forces the cut grain therefrom, the ball K being raised to the top of the box M by the plate, and the chain *j*, to which the ball is attached, draws the bar J to the edge of the plate, as shown in red, Fig. 2. As soon as the ball is freed from the plate *l* the bar J is forced back to its original position by the spring L, which may be of any proper form.

The endless apron may be operated by gearing, or by a belt, *m*, from the shaft F.

The above device is extremely simple, and operates practically well.

I do not claim the rotating cutters C C and the hinged or jointed plates A A, for they have been previously used, and were formerly patented by me; but,

Having thus described my invention, what I claim as new, and desire to secure by Letters Patent, is—

The bar J, attached or hinged to the arms K on the platform H, and operated by the spring L, chain J, ball *k*, which is fitted in the box M, and the plate *l* on the wheel G, when the above parts are arranged to operate in combination with rotary cutters C C and endless apron I, as described, for the purpose set forth.

STEPHEN R. HUNTER.

Witnesses:
 P. BACON DAVIS,
 H. T. TOWNLEY.